A nonexclusive, irrevocable, royalty-free license in the invention herein described, throughout the world for all purposes of the United States Government, with the power to grant sublicenses for such purposes, is hereby granted to the Government of the United States of America.

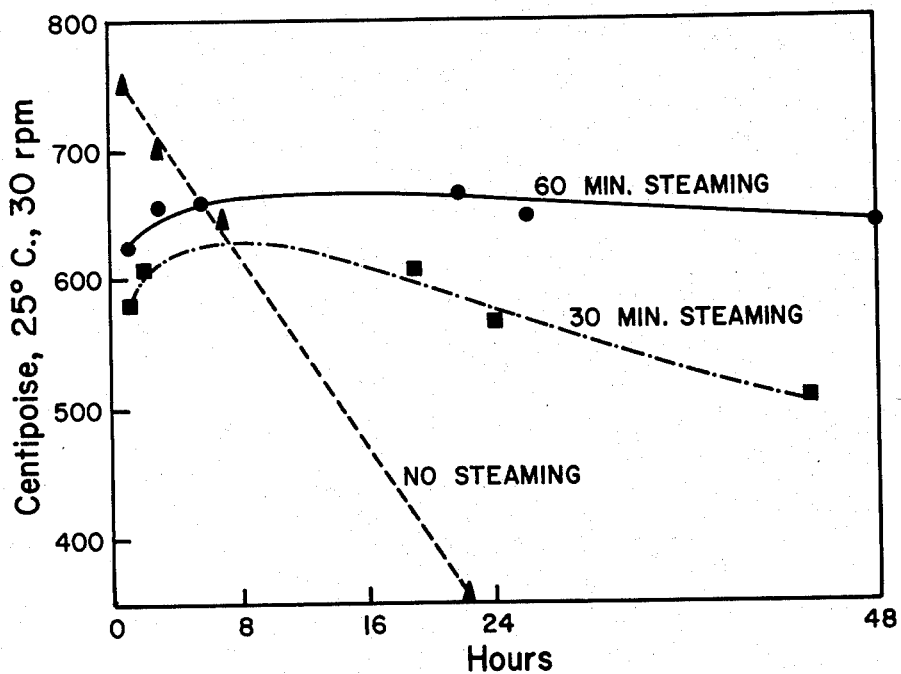
H. L. TOOKEY
V. F. PFEIFER
INVENTORS 3,116,281
CROTALARIA INTERMEDIA ENDOSPERM PRODUCT AND METHOD OF PREPARING THE SAME
Harvey L. Tookey and Virgil F. Pfeifer, Peoria, Ill., assignors to the United States of America as represented by the Secretary of Agriculture
Filed Nov. 22, 1961, Ser. No. 154,377
1 Claim. (Cl. 260—209)
(Granted under Title 35, U.S. Code (1952), sec. 266)

This invention relates principally to a method of obtaining an essentially nontoxic and highly useful galactomannan polysaccharide gum from a novel seed source that presently is uniformly shunned at least in American agricultural circles because of the known high alkaloid content in the seeds of certain of the more commonly encountered species of Crotalaria that cause the intact seeds to be distinctly toxic when ingested by livestock or by human beings.

More specifically, this invention relates to the preparation of an apparently harmless, very finely divided, highly water dispersible, mucilaginous endosperm flour obtained by a very high impact milling and air classification or screening of seeds of a certain species of the genus Crotalaria followed by flaking between rollers, and then hammer milling the flaked endosperm to a fine flour closely resembling that of guar, which readily and uniformly disperses in water to form highly viscous hydrophilic colloidal sols that have marked general utility as thickening and suspending agents, as a size for paper and related products, and as an additive for drilling muds.

In another aspect, this invention also relates to a simple and inexpensive method of pretreating the particular Crotalaria endosperm flour of our invention with steam to stablize the viscosity of a subsequent aqueous solution or dispersion, apparently by inactivating an enzyme that hydrolyzes the polysaccharide polymer in solution.

Plants of the genus Crotalaria are indigenous over a wide area of distribution. Although they are members of the pea or legume family, the known highly poisonous nature of the seeds of the species *Crotalaria sagittalis* (the domestic rattlebox) and of *Crotalaria spectabilis* has stigmatized the entire genus to the extent, for example, that a Federal regulation condemns all shipments or lots of soybeans containing more than several Crotalaria seeds of any species per bushel.

Guar gum is a widely used galactomannan polysaccharide that is obtained from the seeds of the botanically distantly related plant *Cyamopsis tetragonoloba* which is grown mainly in the Far East and therefore is largely imported. A principal object of this invention is the preparation of a hydrophilic polysaccharide from a novel domestic source, which hydrophilic polysaccharide may be employed in place of guar gum. Another object is the discovery of a domestic seed source having an alkaloid content that is distinctly less than that of the seeds of *Crotalaria sagittalis* or *Crotalaria spectabilis* and in which the lesser content of alkaloid furthermore is highly localized elsewhere than in the galactomannan-containing endosperm portion of the seed, thus making possible a commercial method of obtaining a harmless product having thickening and sizing properties equal to or even better than those of guar gum. Still another object is an economical method of milling *Crotalaria intermedia* seed in such a manner as to selectively disintegrate the highly toxic germ and hull portions of the seed to particles that are less than about 0.0117 inch (50 mesh) size which can then be cleanly separated by screening or by air classification from the distinctly larger harmless endosperm particles. Yet another object is a method of fractionating the seed of *Crotalaria intermedia* so as to produce a harmless endosperm flour essentially free of any adhering highly toxic hull or germ. Still another object is a method of stablizing the unusually high initial viscosity of aqueous dispersions or solutions of the *Crotalaria intermedia* endosperm flour against rapid deterioration. Still other objects will be apparent to one skilled in the art during the course of the following specification and in the claims.

In the course of fundamental investigations on Crotalaria seed which have led to the more immediate and practical aspects of our invention, we discovered that the endosperm of seeds of the genus Crotalaria consist wholly or substantially entirely of a water-dispersible mucilaginous galactomannan. We have also discovered not only that there is much less total alkaloid in the seeds of *Crotalaria intermedia* than in those of *Crotalaria sagittalis* or *Crotalaria spectabilis* but that in *Crotalaria intermedia* the smaller amount of alkaloid that is present is localized essentially or entirely in the hull and germ, the trace of alkaloid that we detected in our *Crotalaria intermedia* endosperm flour apparently resulting from the presence of a very small amount of non-endosperm material. Table I shows the results of our qualitative tests on *Crotalaria intermedia* endosperm flour. Commercial guar gum tested for comparison likewise showed a trace of alkaloid.

TABLE I

| Material tested | Alkaloid test reagent | | |
|---|---|---|---|
| | Potassium iodoplatinate | Mayer's reagent | Phosphomolybdic acid |
| *Crotalaria intermedia*, whole seeds | + | ++ | ++ trace |
| Commercial guar gum | – | – | trace |
| *Crotalaria intermedia* endosperm flour | – | – | trace |

Preliminary reports of rat feeding studies from a cooperating laboratory indicate that immature rats given a standard rat diet to which had been added 10 percent by weight of our *Crotalaria intermedia* endosperm flour gained weight less rapidly than did the control rats but there were no deaths whereas equivalent admixtures of the standard diet and either the whole seed or the germ and hull particles were quickly and uniformly fatal, and if this evidence is expanded it is possible that the present strict attitude and rejection of all species of Crotalaria seeds may eventually be modified with respect to the essentially nontoxic *Crotalaria intermedia* endosperm flour of the present invention even for low proportion food additive uses, especially since our process provides a simple yet reliable method for obtaining an essentially nontoxic domestic substitute for guar gum that is practically or with care wholly free of any of the undesirable germ or hull substance, and the dispersions or solutions of which are equal in viscosity to those of guar and are superior to those of guar as a wet end additive for paper.

Having determined the nonpoisonous character of the *Crotalaria intermedia* endosperm and the necessity for our purposes of freeing it from the highly toxic germ and seed coat or hull, we found that the untreated whole seeds can be selectively disintegrated by a high energy impact operation such as is provided in a high speed pin mill or other impact mill capable of providing impact velocities of about 350–500 feet per second combined with an air classification step in which the highly brittle and therefore minutely disintegrated hull and germ portions of the seed are quite completely separated from the tougher, more elastic and therefore larger particles of endosperm. Although it is old to flake guar endosperm between smooth rolls after a required tempering or moistening step, we have found that, unlike those of guar, the air classified particles of *Crotalaria intermedia* endosperm can be flaked without any tempering or moistening and the flakes then ground to a flour that readily disperses in water to form highly viscous sols or solutions.

As shown by the curves of FIGURE 1, the initial viscosity of a 0.7 percent solution of untreated *Crotalaria intermedia* endosperm flour is 750 centipoises which falls progressively during the course of 24 hours to a value of little more than 100 centipoises. In sharply contrasting improvement, solutions made with the same flour that has been exposed as a thin layer of freely flowing live steam at ambient pressure for 30 minutes or 60 minutes followed by air drying have somewhat lower initial viscosities that however are quite stable for as long as 48 hours.

The following example is presented to illustrate the practice of our invention, but it is understood that one skilled in the art may prefer to employ functionally equivalent disintegrating apparatus and slightly modified conditions without departing from the teachings and spirit of this disclosure. We also point out that the mechanical operations that serve to produce our novel *Crotalaria intermedia* endosperm flour are equally effective in producing a high grade galactomannan flour from the seeds of *Cyamopsis tetragonoloba*.

*Example 1*

Fifty pounds of *Crotalaria intermedia* seed containing 12 percent moisture were fed through a commercial pin mill whose 6.3-inch rotor was revolving at 18,000 r.p.m. to impart impact energy corresponding to a speed of about 28,000 feet per minute or about 465 feet per second. The ground seed was then passed through a laboratory model Pillsbury air classifier to remove particles smaller than 40 microns, and then subjected successively to screening through a 40-mesh screen (0.0165 inch openings) and a 50-mesh screen (0.0117 inch openings). The material retained on the 40-mesh screen amounted to 8.8 pounds (17.6 percent based on the whole seeds) of acceptable galactomannan gum product analyzing 4.1 percent protein, 3.0 percent acid insoluble residue, and 10.6 percent moisture. The material retained on the 50-mesh screen, being less pure, was aspirated in a standard grain aspirator to yield 2.4 pounds (4.8 percent based on the whole seeds) of galactomannan gum product analyzing 7.2 percent protein, 9.0 percent acid insoluble residue, and 10.7 percent moisture. Combination of the two coarse fractions yielded 11.2 pounds (22.4 percent based on the whole seeds) of acceptable galactomannan gum product analyzing 4.8 percent protein, 4.3 percent acid insoluble residue, and 10.6 percent moisture. To provide a product that disperses readily in water we flaked the coarse product on a roller mill without pretreatment and ground the resulting flakes to a fine flour in a hammer mill.

Having fully disclosed our invention, we claim:

A method of preparing a hydrophilic mucilaginous polysaccharide gum product comprising the steps of (*a*) subjecting *Crotalaria intermedia* seeds to a force representing an impact speed of about 350–500 feet per second; (*b*) air-classifying to remove particles smaller than 40 microns; (*c*) screening the retained products greater than 40 microns on a 50-mesh screen having 0.0117 inch openings to obtain the substantially pure endosperm fraction retained thereon; and (*d*) subjecting the said retained fraction to air aspiration to remove any remaining dust and fine hull material.

References Cited in the file of this patent

UNITED STATES PATENTS

| | | |
|---|---|---|
| 2,593,528 | Bolley et al. | Apr. 22, 1952 |
| 2,891,050 | Elverum et al. | June 16, 1959 |
| 2,976,274 | McNeely et al. | Mar. 21, 1961 |
| 3,007,879 | Jordan | Nov. 7, 1961 |
| 3,042,668 | Monti et al. | July 3, 1962 |